United States Patent
Atsuumi

[19]

[11] Patent Number: 6,078,419

[45] Date of Patent: *Jun. 20, 2000

[54] OPTICAL SCANNING APPARATUS WITH DESIGN FLEXIBILITY

[75] Inventor: Hiromichi Atsuumi, Yokohama, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,999

[22] Filed: May 15, 1997

[30] Foreign Application Priority Data

May 17, 1996 [JP] Japan ................................... 8-123062
Jul. 23, 1996 [JP] Japan ................................... 8-192635
Oct. 23, 1996 [JP] Japan ................................... 8-280862

[51] Int. Cl.$^7$ .................................................... G02B 26/08
[52] U.S. Cl. ........................................... 359/207; 359/216
[58] Field of Search .................................... 359/205, 207, 359/208, 216, 201, 212

[56] References Cited

U.S. PATENT DOCUMENTS 5,751,464  5/1998  Yoshikawa et al. ..................... 359/208
5,805,323  9/1998  Ichikawa ................................. 359/205

FOREIGN PATENT DOCUMENTS 64-78214   3/1989   Japan .
1-200221   8/1989   Japan .
4-194814   7/1992   Japan .
6-123844   5/1994   Japan .

*Primary Examiner*—Cassandra Spyrou
*Assistant Examiner*—Euncha Cherry
*Attorney, Agent, or Firm*—Oblon, Spivak, McClelland, Maier & Neustadt, P.C.

[57] ABSTRACT

An optical scanning apparatus includes a light source unit for emitting a light beam, an image-forming lens for imaging the light beam in a main-scanning direction, a beam deflector for reflecting and deflecting a line image produced by the image-forming lens, a reflective optical system including a plurality of reflecting mirrors for reflecting a deflected light beam incident on the reflective optical system a plurality of times, wherein reflecting surfaces of the plurality of reflecting mirrors are tilted with respect to a system axis of the optical scanning apparatus, the reflective optical system includes an image-forming mirror for converging the deflected light beam to form a beam spot for scanning a scanned surface at a constant velocity, and the image-forming mirror has an anamorphic configuration obtained by rotating a curve drawn with a first radius on a main-scanning plane, around an axis residing on the main-scanning plane and parallel with the main-scanning direction maintaining a second radius.

20 Claims, 12 Drawing Sheets

CURVATURE OF FIELD

SCAN LINE BOW fθ CHARACTERISTIC

CURVATURE OF FIELD

SCAN LINE BOW fθ CHARACTERISTIC

CURVATURE OF
FIELD

SCAN LINE
BOW $f\theta$ CHARACTERISTIC

CURVATURE OF FIELD

SCAN LINE BOW fθ CHARACTERISTIC

ω = 45°

-4.00　　4.00
(mm)
CURVATURE OF FIELD

ω = 45°

-0.10　　0.10
(mm)
SCAN LINE BOW

ω = 45°

-2.00　　2.00
(%)
fθ CHARACTERISTIC

ω = 45°

-4.00　　4.00
　　　　(mm)
CURVATURE OF
FIELD

ω = 45°

-0.10　　0.10
　　　　(mm)
SCAN LINE
BOW

ω = 45°

-1.00　　1.00
　　　　(%)
fθ CHARACTERISTIC

ω = 40°

-4.00　　4.00
　　　　(mm)
CURVATURE OF
FIELD

ω = 40°

-0.10　　0.10
　　　　(mm)
SCAN LINE
BOW

ω = 40°

-2.00　　2.00
　　　　(%)
fθ CHARACTERISTIC

OPTICAL SCANNING APPARATUS WITH DESIGN FLEXIBILITY

BACKGROUND OF THE INVENTION

1. Field of the Invention

The present invention generally relates to optical scanning apparatuses and more particularly, to an optical scanning apparatus for converging a light beam carrying image information on a scanned medium, using an image-forming mirror. The optical scanning apparatus of the present invention is suitably used in a write optical system of laser printers, image forming apparatuses, measuring equipment and testing devices.

2. Description of the Related Art

Various optical apparatuses have been proposed for converging a light beam deflected by a deflector on a scanned medium, using an image forming mirror. Many of these optical scanning apparatuses are provided with facet-inclination-correction function for correcting shifts of points of beam convergence occurring as a result of an inclination of a facet of the deflector. For example, Japanese Laid-Open Patent Application No. 1-200221 provides for facet inclination correction by providing a facet-inclination-correction toroidal lens in an optical system. Japanese Laid-Open Patent Application No. 6-123844 provides for facet inclination correction by providing a facet-inclination-correction elongated cylindrical element in an optical system. These approaches are designed to eliminate the scan line shift due to the inclination of the polygon facet of the deflector by placing the polygon facet and the scanned surface in a conjugated arrangement.

In an alternative approach, Japanese aid-Open Patent Application No. 4-194814 discloses an mage-forming mirror provided with a facet-inclination-correction function.

However, providing a facet-inclination-correction elongated cylindrical element (No. 6-123844) or a facet-inclination-correction (elongated) toroidal lens (No. 1-200221) in an optical system increases the cost of the optical scanning apparatus and decreases the flexibility in designing the apparatus.

According to the approach disclosed in Japanese Laid-Open Patent Application No. 4-194814, it is difficult to provide a satisfactory separation of optical paths. If the separation of optical paths is small, the flexibility in designing the apparatus suffers greatly.

In order to ensure a large angle of separation, a half mirror must be used. However, use of a half mirror results in a relatively high cost and a relatively large space required for the apparatus. Another disadvantage in using a half mirror is that a beam intensity drops to approximately ¼ after passing through the half mirror.

Providing a large separation of optical paths without using a half mirror, however, results in a relatively large scan line bow, necessitating a reduction in the angle of field, as is well known in the art. If the angle of field is reduced, the beam has to travel a relatively long distance in order to scan an area of a desired size. In order to ensure a satisfactorily large angle of field, the image-forming mirror must be machined so that it is deflected in a sub-scanning direction.

As described above, the optical scanning apparatuses according to the related art have various inherent problems in terms of their cost and production.

Japanese Laid-Open Patent Application No. 64-78214 provides alternative optical scanning wherein a light beam is reflected multiple times in a reflective optical system comprising a spherical concave mirror and a reflecting mirror arranged opposite to each other. However, the optical scanning system disclosed in Japanese Laid-Open Patent Application No. 64-78214 does not provide for facet inclination correction for correcting a scan line shift due to an inclination of a facet of a deflector such as a polygon mirror. Accordingly, a variation in scanning pitches occurring as a result of an inclination of a deflector cannot be prevented.

SUMMARY OF THE INVENTION

Accordingly, a general object of the present invention is to provide an optical scanning apparatus in which the aforementioned problems are eliminated.

Another and more specific object of the present invention is to provide an optical scanning apparatus capable of separating optical paths with an advantageously small scan line bow without using a half mirror. The present invention achieves this by causing a light beam to be reflected multiple times by an image-forming mirror provided with a facet inclination correction function.

Still another object of the present invention is to provide an optical scanning apparatus capable of reducing the length of an optical path of a synchronization light beam for obtaining a synchronizing signal, so that the size of the optical scanning apparatus is reduced.

The aforementioned objects can be attained by an optical scanning apparatus comprising: a light source unit for emitting a light beam for optical scanning; an image-forming lens for producing a line image, elongated in a main-scanning direction, of the light beam from the light source unit; a beam deflector for causing the line image to be reflected by its deflecting and reflecting surface so as to produce a deflected light beam deflected at a constant angular velocity; a reflective optical system including a plurality of reflecting mirrors for reflecting the deflected light beam incident on the reflective optical system a plurality of times; wherein reflecting surfaces of the plurality of reflecting mirrors are tilted with respect to a system axis of the optical scanning apparatus; the reflective optical system includes an image-forming mirror for converging the deflected light beam to form a beam spot for scanning a scanned surface at a constant velocity; and the image-forming mirror has an anamorphic configuration obtained by rotating a curve drawn with a first radius on a main-scanning plane, around an axis residing on the main-scanning plane and parallel with the main-scanning direction, maintaining a second radius.

According to the optical scanning apparatus of the present invention, since the light beam is reflected by an anamorphic image-forming mirror multiple times, it is possible to provide a facet inclination correction and a satisfactory separation of optical paths without using a half mirror, while maintaining a small scan line bow at the same time. Since the apparent optical path length can also be reduced, the size of the optical scanning apparatus is reduced.

The image-forming mirror may have an aspherical configuration obtained by rotating an aspherical curve drawn on the main-scanning plane, around an axis residing on the main-scanning plane and parallel with the main-scanning direction, maintaining the second radius.

According to this aspect of the present invention, the curvature of field characteristic and the constant velocity characteristic (fΘ characteristic) are improved.

The reflective optical system may be constructed such that a plurality of reflecting mirrors are formed to be integral with each other and a transparent window for causing an exit ray to pass through is provided as part of the reflective optical system.

According to this aspect of the present invention, the cost of producing the optical scanning apparatus is reduced.

The plurality of reflecting mirrors formed to be integral with each other may be provided on a transparent window of the optical scanning apparatus by vapor deposition.

According to this aspect of the present invention, the transparent window may serve as a dust guard and the reflecting mirrors simultaneously, thus reducing the number of components constituting the optical scanning apparatus, and the cost of producing the same.

The deflected light beam entering the reflective optical system may first be incident on the image-forming mirror.

According to this aspect of the present invention, a large separation of optical paths is ensured and the flexibility in designing the optical scanning apparatus is improved.

The reflecting mirrors in the reflective optical system may be provided on a transparent window of the optical scanning apparatus by vapor deposition.

According to this aspect of the present invention, the transparent window may serve as a dust guard and the reflecting mirrors simultaneously. Therefore, the number of components is reduced and the cost of producing the optical scanning apparatus is reduced.

The image-forming mirror may have a normal toroidal configuration obtained by rotating a curve drawn with a first radius on a sub-scanning plane, around an axis residing on the sub-scanning plane and parallel with the sub-scanning direction, maintaining a second radius.

The aforementioned objects can also be achieved by an optical scanning apparatus comprising: a light source unit for emitting a light beam for optical scanning; an image-forming lens for producing a line image, elongated in a main-scanning direction, of the light beam from the light source unit; a beam deflector for causing the line image to be reflected by its deflecting and reflecting surface so as to produce a deflected light beam deflected at a constant angular velocity; a reflective optical system including a plurality of reflecting mirrors for reflecting the deflected light beam incident on the reflective optical system a plurality of times; wherein reflecting surfaces of the plurality of reflecting mirrors are tilted with respect to a system axis of the optical scanning apparatus; the reflective optical system includes an image-forming mirror for converging the deflected light beam to form a beam spot for scanning a scanned surface at a constant velocity; and the image-forming mirror has a normal toroidal configuration obtained by rotating a curve drawn with a first radius on a sub-scanning plane, around an axis residing on the sub-scanning plane and parallel with sub-scanning direction, maintaining a second radius.

According to the above-described optical scanning apparatus of the present invention, since the light beam is reflected by a normal toroidal image-forming mirror multiple times, it is possible to provide a facet inclination correction and satisfactory separation of optical paths without using a half mirror, while maintaining a small scan line bow at the same time. Since the apparent optical path length can also be reduced, the size of the optical scanning apparatus is reduced.

The reflecting mirrors in the reflective optical system may be formed to be integral with each other.

According to this aspect of the present invention, it is possible to reduce the cost of producing the optical scanning apparatus.

The reflecting mirrors in the reflective optical system may be provided on a transparent window by vapor deposition.

According to this aspect of the present invention, the transparent window serves as a dust guard and the reflecting mirrors simultaneously. Therefore, the number of components is reduced and the cost of producing the optical scanning apparatus is reduced.

The reflecting mirrors in the reflective optical system may be cylindrical mirrors having a curvature in a sub-scanning direction.

According to this aspect of the present invention, an added flexibility in designing the optical scanning apparatus is provided in correcting the curvature of field in the sub-scanning direction.

The optical scanning apparatus may be designed such that the deflected light beam is reflected by the image-forming mirror a total of n times and a synchronizing beam is reflected by the image-forming mirror a total of n+1 or more times.

According to this aspect of the present invention, it is possible to properly separate the synchronization beam from the scanning light beam even if the optical path of the synchronization beam is short. Therefore, the size of the optical scanning apparatus is reduced.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
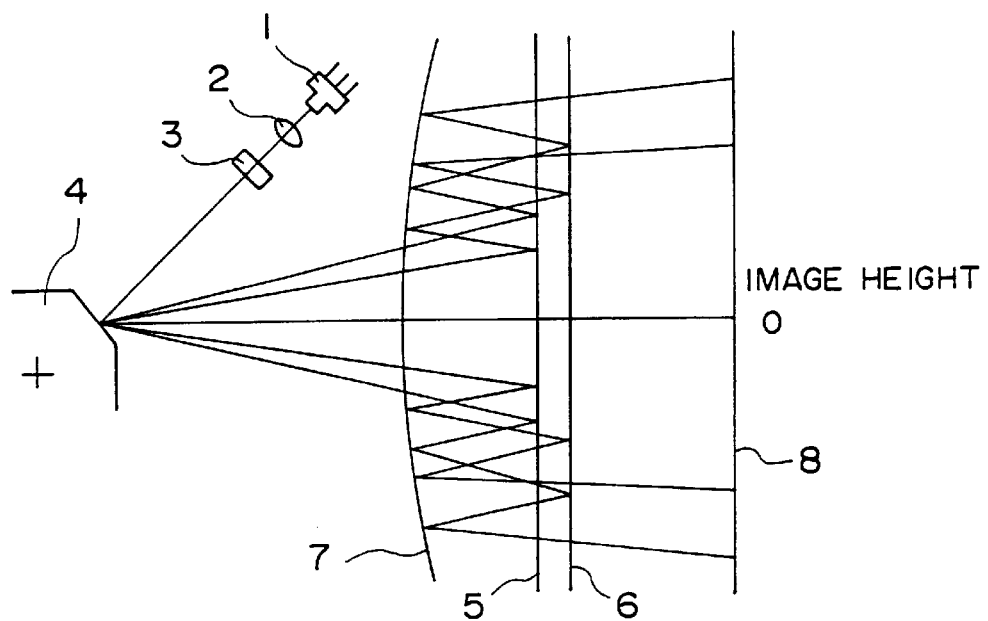
FIG. 1 is a schematic diagram showing a first arrangement of the optical scanning apparatus of the present invention on a main-scanning plane.

FIG. 1 shows a first arrangement of the optical scanning apparatus according to the present invention. Referring to FIG. 1, a light source 1 is constructed of a laser diode (LD) or a light-emitting diode (LED). A diverging light beam emitted by the light source 1 passes through a coupling lens 2. The coupling lens may converge or diverge the transmitted light beam. Alternatively, the coupling lens 2 may turn the transmitted light beam into a substantially parallel light beam.

The light beam passing through the coupling lens 2 passes through a cylindrical lens 3 provided as a line-image-forming element so as to be converged only in the sub-scanning direction, resulting in a line image elongated in a main-scanning direction and formed in the neighborhood of a deflecting and reflecting facet of a deflector 4. The deflector 4 deflects the light beam incident thereon at a constant angular velocity. The light beam reflected by the deflecting and reflecting facet of the deflector 4 is reflected by a return mirror 5 toward an image forming mirror (fΘ mirror) 7. The light beam is converged by the image-forming mirror 7 and exits the image-forming mirror 7 toward a second return mirror 6. The light beam reaching the second return mirror 6 is reflected thereby toward the image-forming mirror 7 again. The image-forming mirror 7 reflects and converges the light beam reflected by the second return mirror 6. Therefore, as the deflector 4 is rotated at a constant angular velocity, the light beam deflected by the deflector 4 and converged by the image-forming mirror 7 forms a beam spot for scanning a scanned surface of a photosensitive drum 8 at a constant velocity.

While the arrangement of FIG. 1 shows only one image-forming mirror 7, the light beam is reflected twice in the image-forming mirror 7. Accordingly, the image-forming mirror 7 performs an aberration correction function identical to that performed by two image-forming mirrors. The arrangement of FIG. 1 is a facet inclination correction optical system wherein the facet of the deflector 4 and the scanned surface are in a conjugated arrangement in the sub-scanning direction. Therefore, a variation in scanning pitches occurring as a result of an inclination of a facet of the deflector 4 such as a polygon mirror is corrected.

Figure 12:
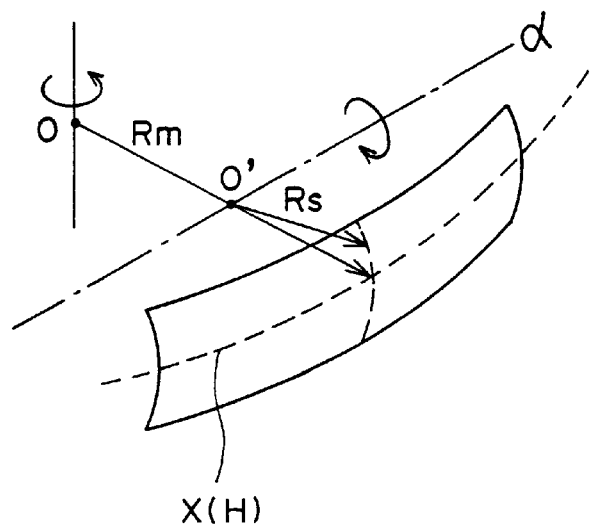
FIG. 12 is a perspective view showing a configuration of an image-forming mirror used in the optical scanning apparatus of the present invention.

A description will now be given of a configuration of a reflecting surface of the image-forming mirror 7. As shown in FIG. 12, the reflecting surface of the image-forming mirror 7 has an anamorphic configuration obtained by rotating a curve X(H) drawn with a radius of Rm around a point O on a main-scanning plane, around an axis α residing on a main-scanning plane and parallel with the main-scanning direction, maintaining a radius Rs between the curve X(H) and a point O' where the axis α crosses the radius Rm. Known optical systems including an anamorphic image-forming mirror have a disadvantage in that separation of optical paths is difficult and a scan line bow is relatively large. According to the arrangement shown in FIGS. 1 and 12, it is possible to separate optical paths without using a half mirror and obtain an optical system characterized by a relatively small scan line bow.

Figure 2:
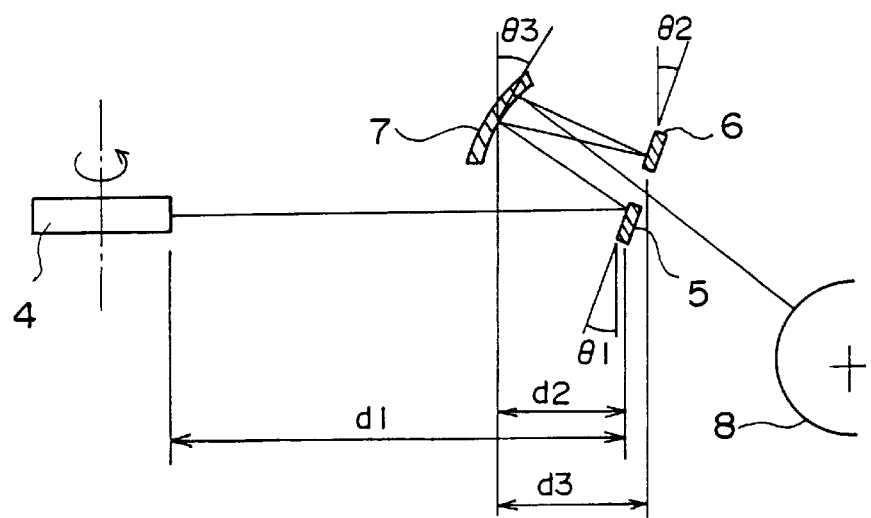
FIG. 2 is a schematic diagram showing a layout of optical elements in the first arrangement on a sub-scanning plane.

A description will now be given of optical scanning apparatus according to specific embodiments. FIG. 2 shows the aforementioned first arrangement on a sub-scanning plane. Referring to FIG. 2, the first return mirror 5 is tilted at an angle Θ1, the second return mirror 6 is tilted at an angle Θ2 and the image-forming mirror 7 is tilted at an angle Θ3. The angles Θ1, Θ2 and Θ3 are measured in a clockwise direction from a line perpendicular to a main-scanning plane scanned by a beam from the deflector 4. The deflecting and reflecting surface of the deflector 4 is at a horizontal distance d1 from the reflecting surface of the first return mirror 5. The reflecting surface of the first return mirror 5 is at a horizontal distance d2 from the reflecting surface of the image-forming mirror 7. The reflecting surface of the image-forming mirror 7 is at a horizontal distance d3 from the reflecting surface of the second return mirror 6. To facilitate the understanding, FIG. 2 shows only a light beam having an image height of 0.

A description will now be given of a first embodiment of the present invention. The optical scanning apparatus according to the first embodiment has the following dimensions.

| Rm = 300 [mm] | Rs = 128 [mm] | |
| d1 = 40 [mm] | d2 = 23.2 [mm] | d3 = 26.2 [mm] |
| Θ1 = 18° | Θ2 = 18° | Θ3 = 17.85° |

Figure 3A:
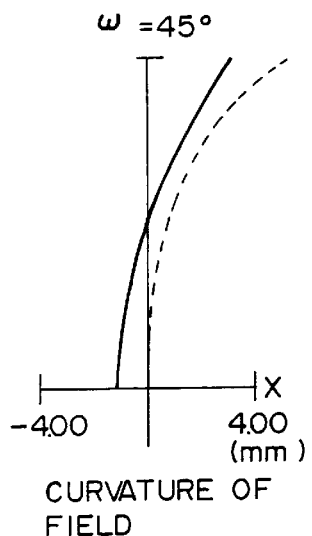
FIG. 3A shows a curvature of field of the optical scanning apparatus according to a first embodiment of the present invention.
Figure 3B:
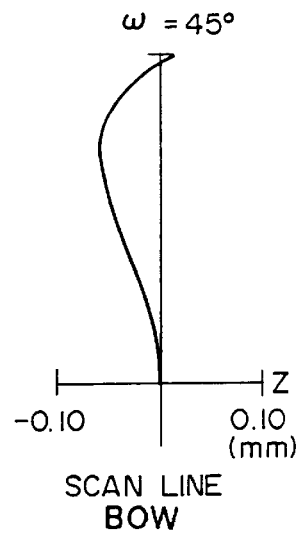
FIG. 3B shows a scan line bow of the optical scanning apparatus according to the first embodiment.
Figure 3C:
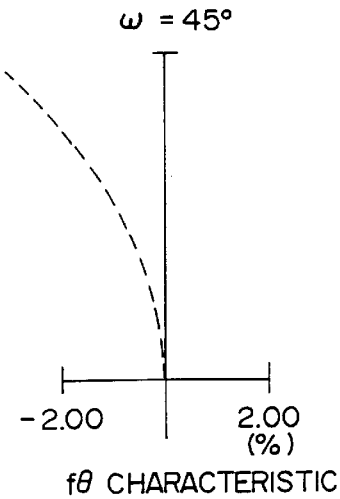
FIG. 3C shows an fΘ characteristic of the optical scanning apparatus according to the first embodiment.

FIGS. 3A, 3B and 3C are graphs showing aberrations that occur in the optical scanning apparatus according to the first embodiment. FIG. 3A shows a curvature of field occurring when the deflector 4 is rotated, the solid line indicating the curvature of field in the sub-scanning direction and the broken line indicating the curvature of field in the main-scanning direction. The solid line in FIG. 3B indicates the scan line bow. The broken line in FIG. 3C indicates the fe characteristic.

The optical scanning apparatus as shown in FIG. 2 may be flexibly designed such that the angles Θ1, Θ2 and Θ3 of the first return mirror 5, the second return mirror 6 and the image-forming mirror 7, respectively, may be changed as required.

Another example will now be given of the configuration of the image-forming mirror 7. Referring to FIG. 12, the reflecting surface of the image-forming mirror 7 may have an aspherical configuration obtained by rotating a curve X(H) defined as per the equation $$X(H) = CH^2/[1 + \{1-(1+K) C^2H^2\}^{1/2}] + A_i H^i$$

where K indicates a constant of a cone and Ai indicates an aspherical coefficient, around the axis α residing on a main-scanning plane and parallel with the main-scanning direction, maintaining the radius Rs between the point O' and the curve X(H).

A description will now be given of a second embodiment according to the present invention. The optical scanning apparatus according to the second embodiment has the following dimensions.

| Rm = 515 [mm] | Rs = 177.5 [mm] | K = −4.6 |
| d1 = 40 [mm] | d2 = 23.1 [mm] | d3 = 26.2 [mm] |
| Θ1 = 18° | Θ2 = 18° | Θ3 = 19.57° |

Figure 4A:
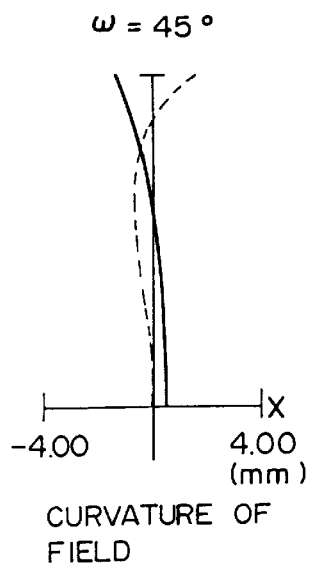
FIG. 4A shows a curvature of field of the optical scanning apparatus according to a second embodiment of the present invention.
Figure 4B:
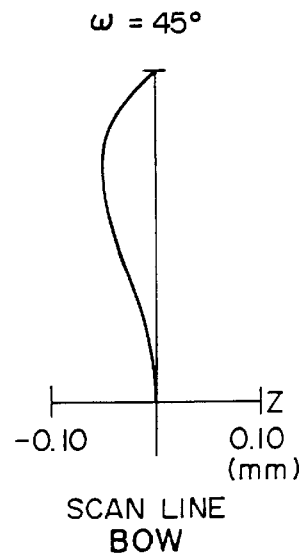
FIG. 4B shows a scan line bow of the optical scanning apparatus according to the second embodiment.
Figure 4C:
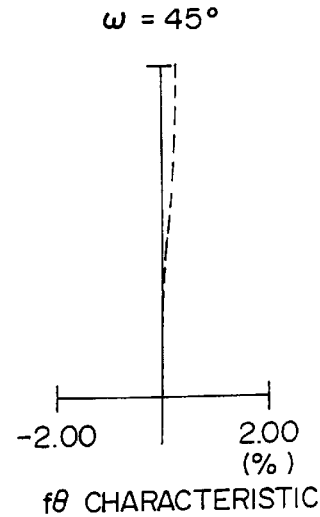
FIG. 4C shows an fΘ characteristic of the optical scanning apparatus according to the second embodiment.

FIGS. 4A, 4B and 4C are graphs showing aberrations that occur in an optical scanning apparatus according to the second embodiment. FIG. 4A shows a curvature of field occurring when the deflector 4 is rotated, the solid line indicating the curvature of field in the sub-scanning direction, and the broken line indicating the curvature of field in the main-scanning direction. The solid line in FIG. 3B indicates the scan line bow. The broken line in FIG. 3C indicates the fΘ characteristic.

While only the constant of a cone K is used in the second embodiment, aberrations may be corrected more properly if the aspherical coefficient Ai is employed.

Figure 5:
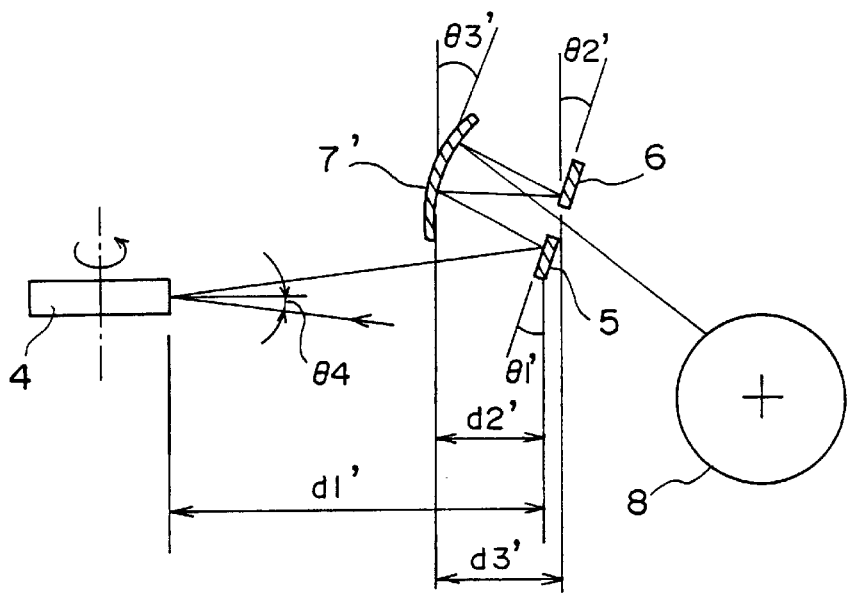
FIG. 5 is a schematic diagram showing a layout of optical elements in a second arrangement of he optical scanning apparatus according to the present invention on a sub-scanning plane.

A description will now be given of a variation of the optical scanning apparatus of FIG. 2. As shown in FIG. 5, the light beam may be incident on the deflector 4 at an angle of Θ4 in the sub-scanning direction. The first return mirror 5 is tilted at an angle Θ1', the second return mirror 6 is tilted at an angle Θ2' and the image-forming mirror 7 is tilted at an angle Θ3'. The angles Θ1', Θ2' and Θ3' are measured in a clockwise direction. The deflecting and reflecting surface of the deflector 4 is at a horizontal distance d1' from the reflecting surface of the first return mirror 5. The reflecting surface of the first return mirror 5 is at a horizontal distance d2' from the reflecting surface of the image-forming mirror 7. The reflecting surface of the image-forming mirror 7 is at a horizontal distance d3' from the reflecting surface of the second return mirror 6.

A description will now be given of a third embodiment of the present invention.

The optical scanning apparatus according to the third embodiment has the following dimensions.

| Rm = 515 [mm] | Rs = 185.5 [mm] | K = −4.8 |
| d1' = 43.1 [mm) | d2' = 24.7 [mm] | d3' = 27.1 [mm] |
| Θ1' = 12° | Θ2' = 12° | Θ3' = 10.75° |
| Θ4 = 8° | | |

Figure 6A:
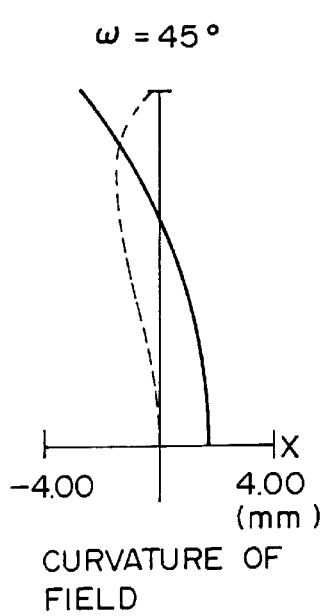
FIG. 6A shows a curvature of field of the optical scanning apparatus according to a third embodiment of the present invention.
Figure 6B:
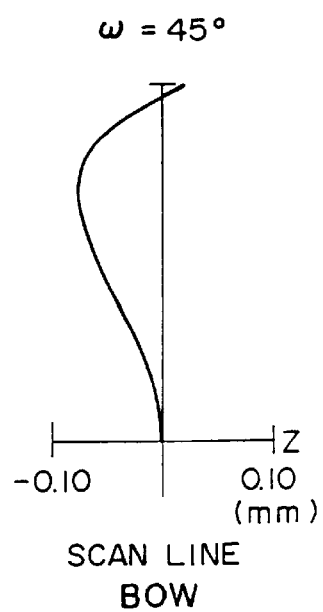
FIG. 6B shows a scan line bow of the optical scanning apparatus according to the third embodiment.
Figure 6C:
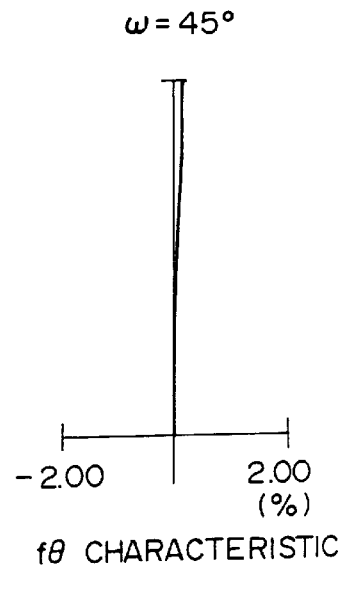
FIG. 6C shows an fΘ characteristic of the optical scanning apparatus according to the third embodiment.

FIGS. 6A, 6B and 6C are graphs showing aberrations that occur in an optical scanning apparatus according to the third embodiment. FIGS. 6A, 6B and 6C are similar to the corresponding drawings in the first and second embodiments, and the description thereof is omitted. It is to be noted that the second and third embodiments provide a better fΘ characteristic than the first embodiment.

Figure 7:
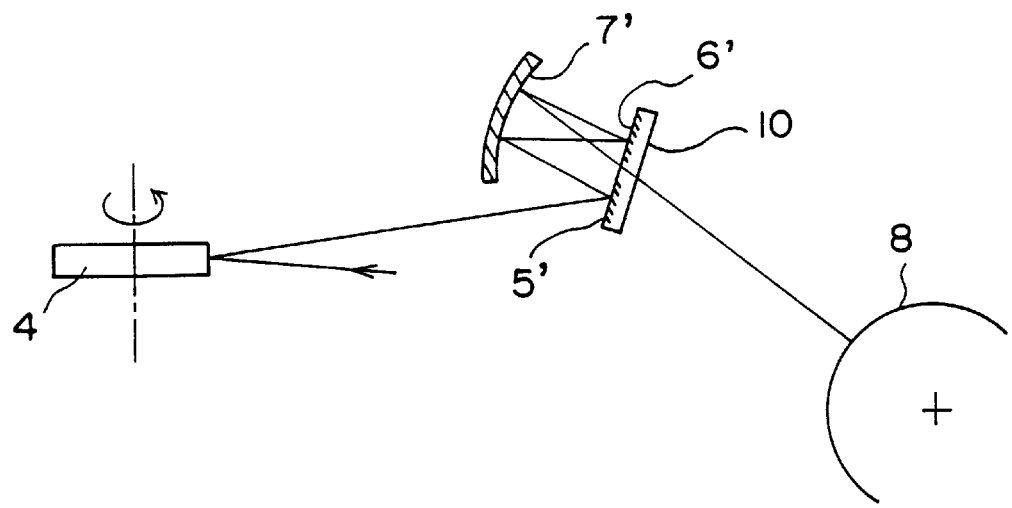
FIG. 7 is a schematic diagram showing a layout of optical elements in a third arrangement of the optical scanning apparatus according to the present invention on a sub-scanning plane.

While the first return mirror 5 and the second return mirror 6 are assumed to be independent of each other in FIGS. 2 and 5, it is also possible to integrate the first return mirror 5 and the second return mirror 6 by substituting therefor reflecting portions 5' and 6' provided on a transparent parallel plate 10, as shown in FIG. 7. In this way, the optical scanning apparatus may be produced at a reduced cost. It is to be noted that the relationship Θ1=Θ2 holds in the first embodiment, and the relationship Θ1'=Θ2' holds in the third embodiment. Therefore, the reflecting surfaces of the first and second return mirrors 5 and 6 reside on the same plane in the first and third embodiments. Accordingly, the construction shown in FIG. 7 is possible in the first and third embodiments. The reflecting portions 5' and 6' may be formed on the transparent parallel plate 10 by, for example, vapor deposition. The area between the reflecting portions 5' and 6' is transparent and transmits light.

Figure 8:
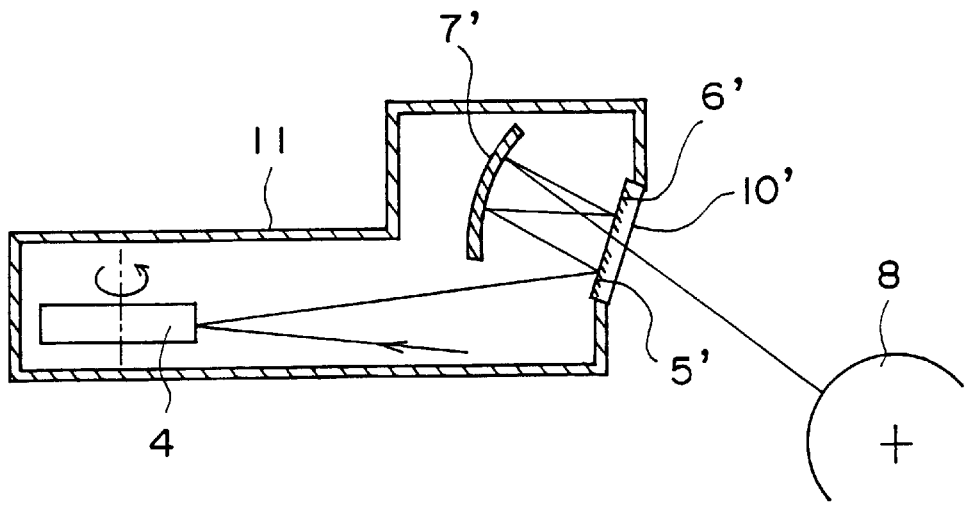
FIG. 8 is a schematic diagram showing a layout of optical elements in a fourth arrangement of the optical scanning apparatus according to the present invention on a sub-scanning plane.

Normally, an optical scanning apparatus is hermetically enclosed in a housing 11 as shown in FIG. 8 in order to prevent the dust from entering the optical scanning apparatus. Therefore, an exit light beam from the optical scanning apparatus reaches a scanned surface of the photosensitive drum 8 via a dustproof transparent window 10' formed of a dustproof glass. Accordingly, the cost of the optical scanning apparatus can be reduced by forming the reflecting portions 5' and 6' at predetermined positions on the transparent window 10' by vapor deposition, so as to substitute for the independent return mirrors 5 and 6.

Figure 9:
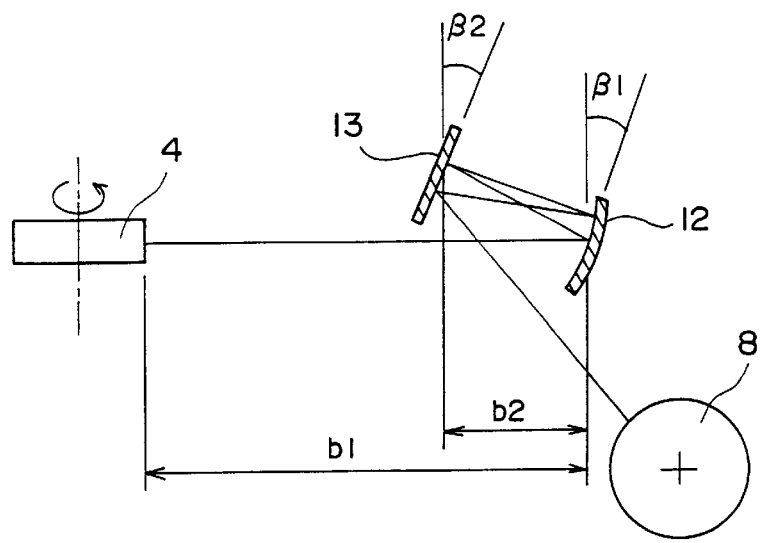
FIG. 9 is a schematic diagram showing a layout of optical elements in a fifth arrangement of the optical scanning apparatus according to the present invention on a sub-scanning plane.

FIG. 9 shows another arrangement of the optical scanning apparatus according to the present invention. In the arrangement of FIG. 9, the light beam reflected by the deflecting and reflecting surface of the deflector 4 is first reflected by an image-forming mirror 12 to a return mirror 13. The light beam reflected by the return mirror 13 is reflected by the image-forming mirror 12 again to the return mirror 13 so that the reflected light beam from the return mirror 13 is directed to the photosensitive drum 8. In this way, a satisfactorily large angle of separation between the light beams can be created so that the optical scanning apparatus can be flexibly designed. Such an optical scanning apparatus may also be constructed such that the light beam is incident on the deflector 4 at the angle Θ4 in the sub-scanning direction, as shown in FIG. 5. It is also possible to divide the return mirror 13 into two individual mirrors.

The deflecting and reflecting surface of the deflector 4 is at a horizontal distance b1 from the reflecting surface of the image-forming mirror 12. The reflecting surface of the image-forming mirror 12 is at a horizontal distance b2 from the reflecting surface of the return mirror 13. The image-forming mirror 12 is tilted at an angle β1, and the return mirror 13 is tilted at an angle β2.

A description will now be given of a fourth embodiment of the present invention.

The optical scanning apparatus according to the fourth embodiment has the following dimensions.

| | | |
|---|---|---|
| Rm = 380 [mm] | Rs = 131.3 [mm] | K = −4.4 |
| b1 = 50 [mm) | b2 = 19.7 [mm] | |
| β1 = 15° | β2 = 25.1° | |

Figure 10A:
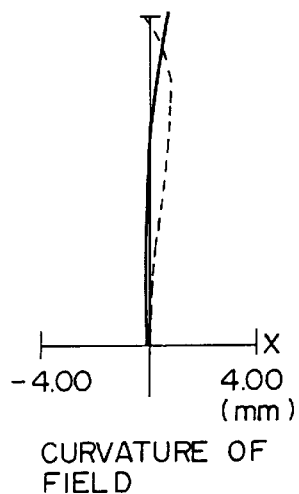
FIG. 10A shows a curvature of field of the optical scanning apparatus according to a fourth embodiment of the present invention.
Figure 10B:
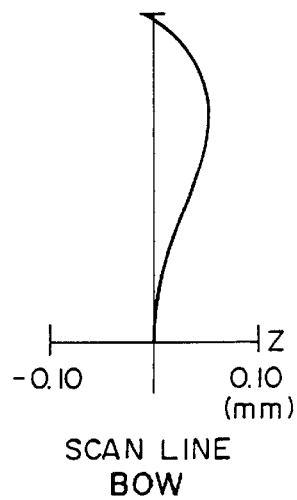
FIG. 10B shows a scan line bow of the optical scanning apparatus according to the fourth embodiment.
Figure 10C:
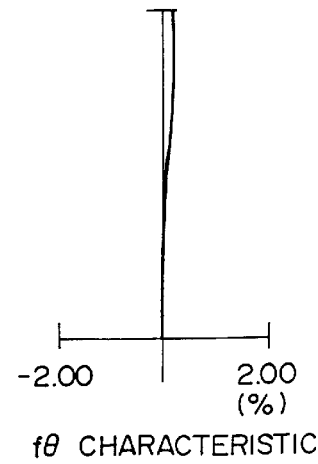
FIG. 10C shows an fΘ characteristic of the optical scanning apparatus according to the fourth embodiment.

FIGS. 10A, 10B and 10C are graphs showing aberrations that occur in an optical scanning apparatus according to the fourth embodiment. FIGS. 10A, 10B and 10C are similar to the corresponding drawings in the foregoing embodiments, and the description thereof is omitted.

Figure 11:
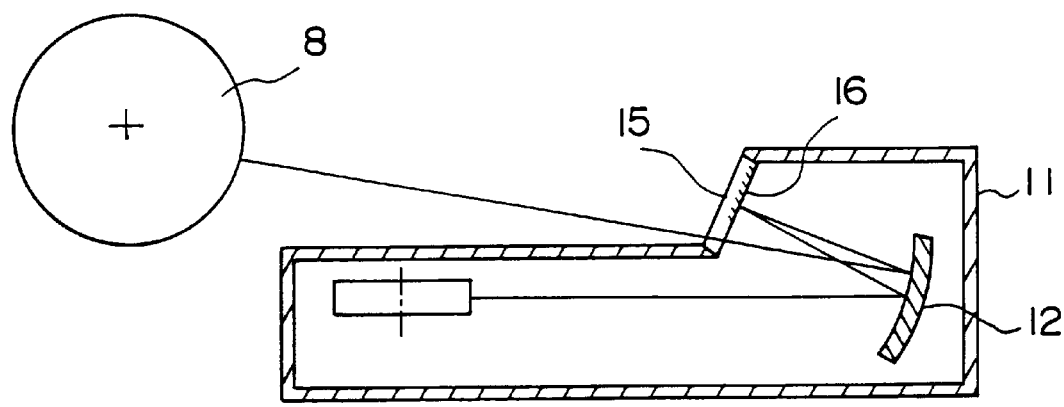
FIG. 11 is a schematic diagram showing a layout of optical elements in a sixth arrangement of the optical scanning apparatus according to the present invention on a sub-scanning direction.

The construction shown in FIG. 9, where the light beam reflected by the deflecting and reflecting surface of the deflector 4 is first reflected by the image-forming mirror 12, allows a dustproof transparent window to serve as a return mirror. As shown in FIG. 11, such a construction can be achieved by forming a return mirror 16 at a predetermined position on a dustproof transparent window 15 by vapor deposition or the like. In this way, the cost of producing the optical scanning apparatus can be reduced. FIG. 11 shows the return mirror 16 reflecting the light beam only once. The second reflected light beam from the image-forming mirror 12 passes through the non-reflecting surface of the dustproof transparent window and reaches the photosensitive drum 8. Therefore, the arrangement shown in FIG. 11 differs from that of FIG. 9 in that the return mirror 13 of FIG. 9 reflects the light beam twice. However, the difference is not a substantial one since the arrangement shown in FIG. 9 and that shown in FIG. 11 provide essentially the same optical system.

The description given above assumes that the image-forming mirror 12 is formed of an anamorphic mirror and the return mirrors 13 and 16 are formed of a flat mirror. However, the flat mirror may be replaced by a mirror having a curvature such as a cylindrical mirror or a spherical mirror.

A description will now be given, with reference to FIGS. 13 and 14, of another arrangement of the optical scanning apparatus.

Figure 13:
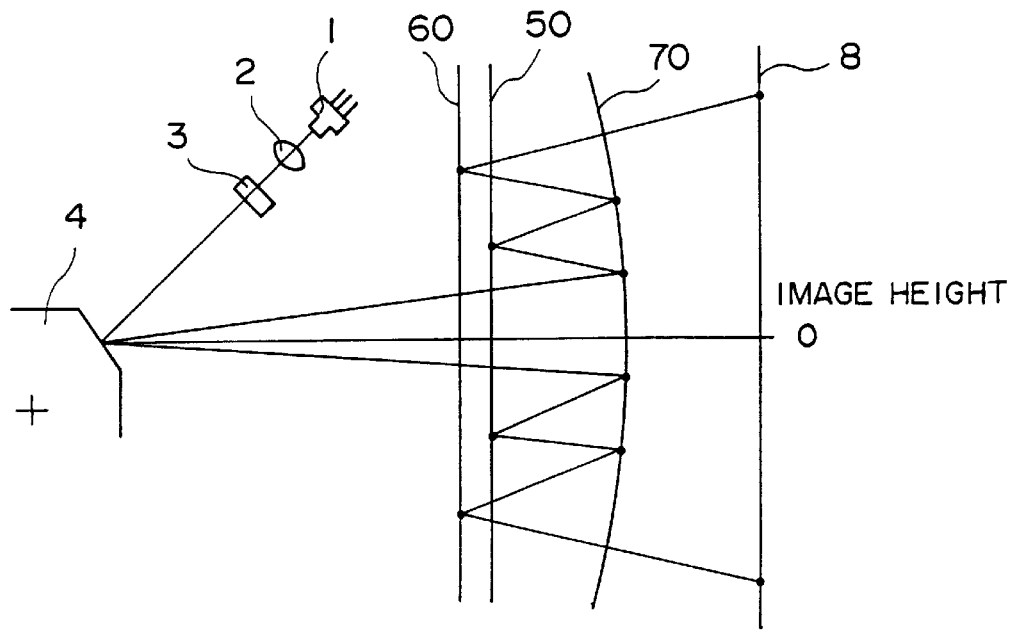
FIG. 13 is a schematic diagram showing a seventh arrangement of the optical scanning apparatus on a main-scanning plane.
Figure 14:
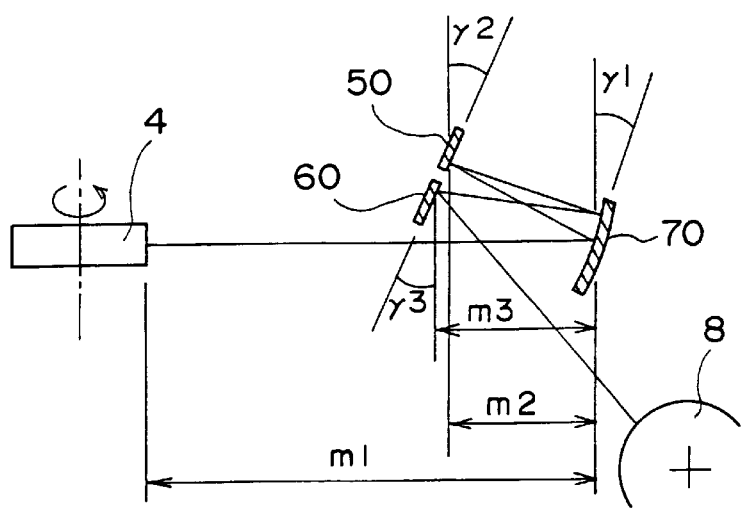
FIG. 14 is a schematic diagram showing a layout of optical elements in the seventh arrangement on a sub-scanning plane.

Referring to FIGS. 13 and 14, the light beam exiting the light source 1 and passing through the coupling lens 2 passes through a cylindrical lens 3 so as to be converged only in the sub-scanning direction, resulting in a line image elongated in a main-scanning direction and formed in the neighborhood of the deflecting and reflecting facet of the deflector 4. The deflector 4 deflects the light beam incident thereon at a constant angular velocity. The light beam reflected by the deflecting and reflecting facet of the deflector 4 is reflected and converged by an image-forming mirror 70 to a first return mirror 50 in accordance with a tilt τ1 described later. The first return mirror 50 reflects the incident light beam to the image-forming mirror 70 which then reflects the it to a second return mirror 60. The light beam reflected by the second return mirror 60 is converged to form a beam spot for scanning the scanned surface of the photosensitive drum 8 at a constant velocity in response to the constant-angular-velocity deflection by the deflector 4.

Like the arrangement described with reference to FIG. 1, the arrangement of FIGS. 13 and 14 uses only one image-forming mirror 70. However, since the light beam is reflected by the image-forming mirror 70 twice, the arrangement of FIGS. 13 and 14 provides the same capability to correct aberrations as an arrangement where two image-forming mirrors are used. In the arrangement of FIGS. 13 and 14, the deflecting and reflecting surface of the deflector and the scanned surface are in a conjugated arrangement in the sub-scanning direction. Thus, an optical system capable of correcting the facet inclination is provided. More specifically, a variation in scanning pitches due to the facet inclination of the deflector 4 such as a polygon mirror can be corrected properly.

Figure 18:
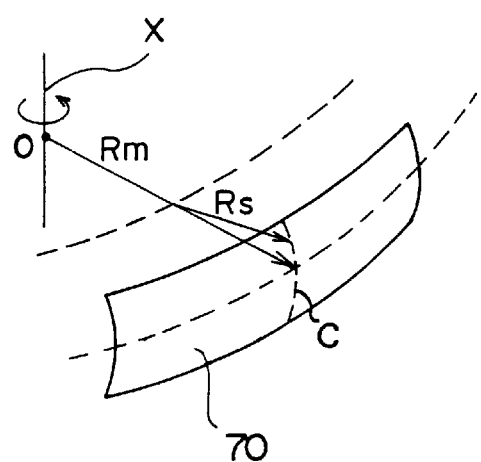
FIG. 18 is a perspective view showing another configuration of an image-forming mirror used in the optical scanning apparatus of the present invention.

A description will now be given of the configuration of the reflecting surface of the image-forming mirror 70. As shown in FIG. 18, the image-forming mirror 70 has a normal toroidal configuration obtained by rotating a curve C drawn with a radius of Rs in the sub-scanning direction, around an X axis residing on the sub-scanning plane and parallel with the sub-scanning direction, maintaining a radius Rm between the curve C and a point O where the axis X crosses the radius Rm. Known optical systems including an anamorphic image-forming mirror have a disadvantage in that separation of optical paths is difficult and a scan line bow is relatively large. According to the construction as shown in FIG. 18, however, it is possible to separate optical paths without using a half mirror and obtain an optical system characterized by a relatively small scan line bow.

FIG. 14 shows the arrangement of FIG. 13 on the sub-scanning plane. Referring to FIG. 14, the image-forming mirror 70 is tilted an angle τ1, the first return mirror 50 is tilted at an angle τ2, and the second return mirror 60 is tilted at an angle τ3. The angles τ1, τ2 and τ3 are measured in a clockwise direction from a line perpendicular to a main-scanning plane scanned by a beam from the deflector 4. The deflecting and reflecting surface of the deflector 4 is at a horizontal distance m1 from the reflecting surface of the image-forming mirror 70. The reflecting surface of the first return mirror 50 is at a horizontal distance m2 from the reflecting surface of the image-forming mirror 70. The reflecting surface of the image-forming mirror 70 is at a horizontal distance m3 from the reflecting surface of the second return mirror 60. FIG. 14 shows only a light beam having an image height of 0 in order to facilitate the understanding.

A description will now be given of a fifth embodiment of the present invention. The optical scanning apparatus according to the fifth embodiment has the following dimensions.

Rm = 420 [mm]   Rs = 145.5 [mm]
m1 = 65 [mm]    m2 = 27.5 [mm]    m3 = 30.6 [mm]
τ1 = 15.24°     τ2 = 25°          τ3 = 25°

Figure 15A:
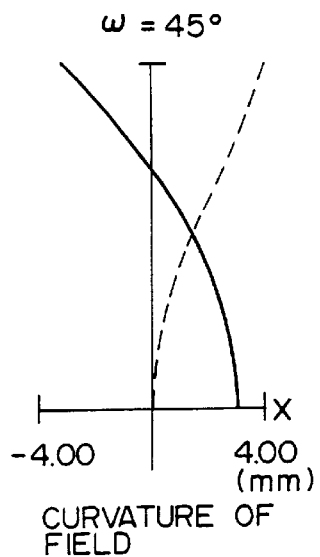
FIG. 15A shows a curvature of field of the optical scanning apparatus according to a fifth embodiment of the present invention.
Figure 15B:
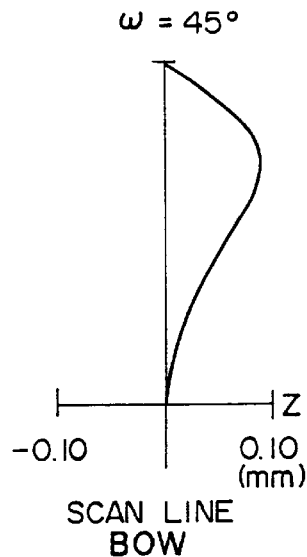
FIG. 15B shows a scan line bow of the optical scanning apparatus according to the fifth embodiment.
Figure 15C:
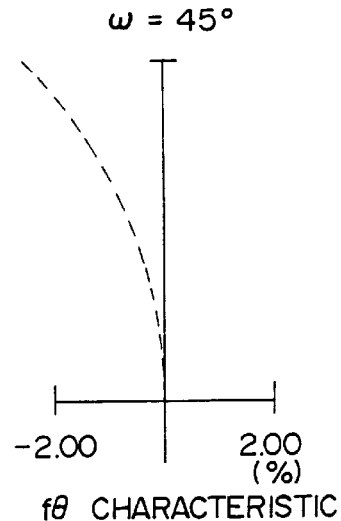
FIG. 15C shows an fΘ characteristic of the optical scanning apparatus according to the fifth embodiment.

FIGS. 15A, 15B and 15C are graphs showing aberrations that occur in an optical scanning apparatus according to the fifth embodiment. FIG. 15A shows a curvature of field occurring when the deflector 4 is rotated, the solid line indicating the curvature of field in the sub-scanning direction and the broken line indicating the curvature of field in the main-scanning direction. The solid line in FIG. 15B indicates the scan line bow. The broken line in FIG. 15C indicates the fΘ characteristic.

The scanning apparatus as shown in FIG. 14 may be flexibly designed such that the angles 1, 2 and 3 of the image-forming mirror 70, the first return mirror 50 and the second mirror 60, respectively, may be changed appropriately.

Figure 16:
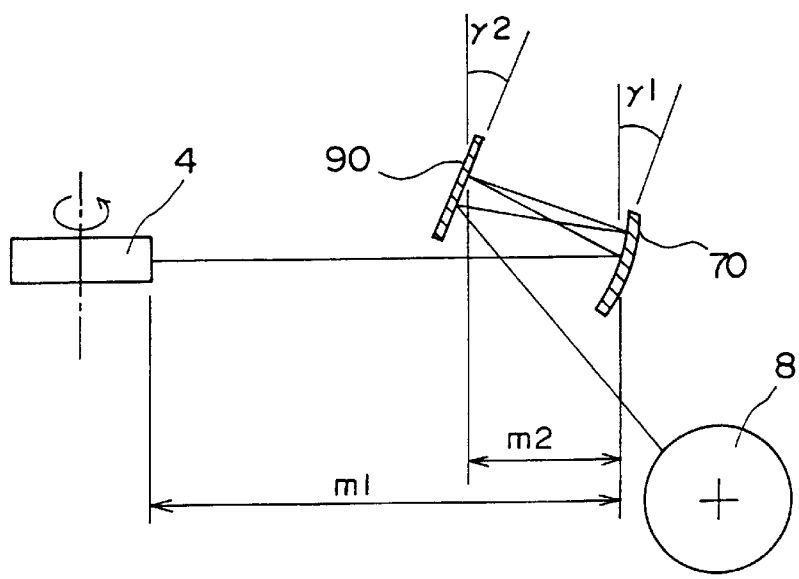
FIG. 16 is a schematic diagram showing a layout of optical elements in an eighth arrangement of the optical scanning apparatus according to the present invention on a sub-scanning direction.

While the first return mirror 50 and the second return mirror 60 are arranged so as to be independent of each other in FIG. 14, it is also possible to integrate the first return mirror 50 and the second return mirror 60 by substituting therefor a third return mirror 90, as shown in FIG. 16. In this way, the optical scanning apparatus may be produced at a reduced cost. It is to be noted that, in the fifth embodiment, the relationship τ2=τ3 holds and the reflecting surfaces of the first and second return mirrors 50 and 60 reside on the same plane. Accordingly, the construction wherein the first and second return mirrors 50 and 60 are integrated is possible.

Figure 17:
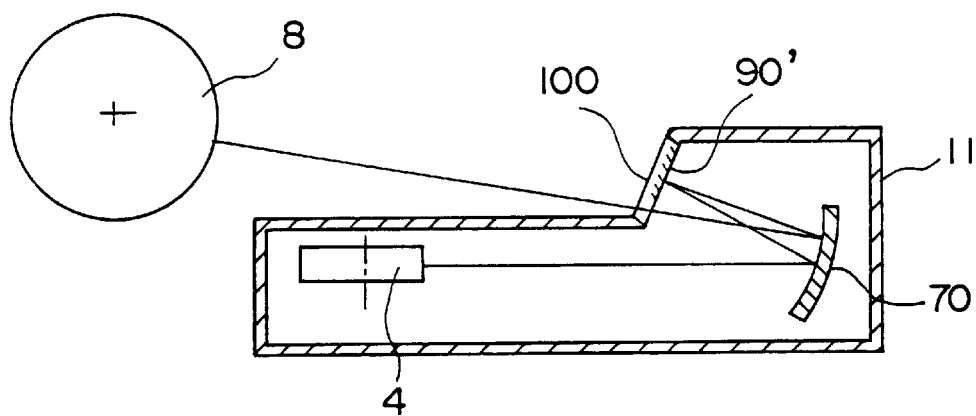
FIG. 17 is a schematic diagram showing a layout of optical elements in a ninth arrangement of the optical scanning apparatus according to the present invention on a sub-scanning plane.

Normally, an optical scanning apparatus is hermetically enclosed in a housing 11 as shown in FIG. 17 in order to prevent the dust from entering the optical scanning apparatus. Therefore, an exit light beam from the optical scanning apparatus reaches a scanned surface of the photosensitive drum 8 via a dustproof transparent window 100 formed of a dustproof glass. Accordingly, the cost of the optical scanning apparatus can be reduced by forming a reflecting portion 90' at a predetermined position on the transparent window 100 by vapor deposition, so as to substitute for the third return mirror 90. In this construction, the window 100 serves as a dust guard and a return mirror simultaneously.

A description will now be given, with reference to FIGS. 19 and 20, of another arrangement of the optical scanning apparatus.

Figure 19:
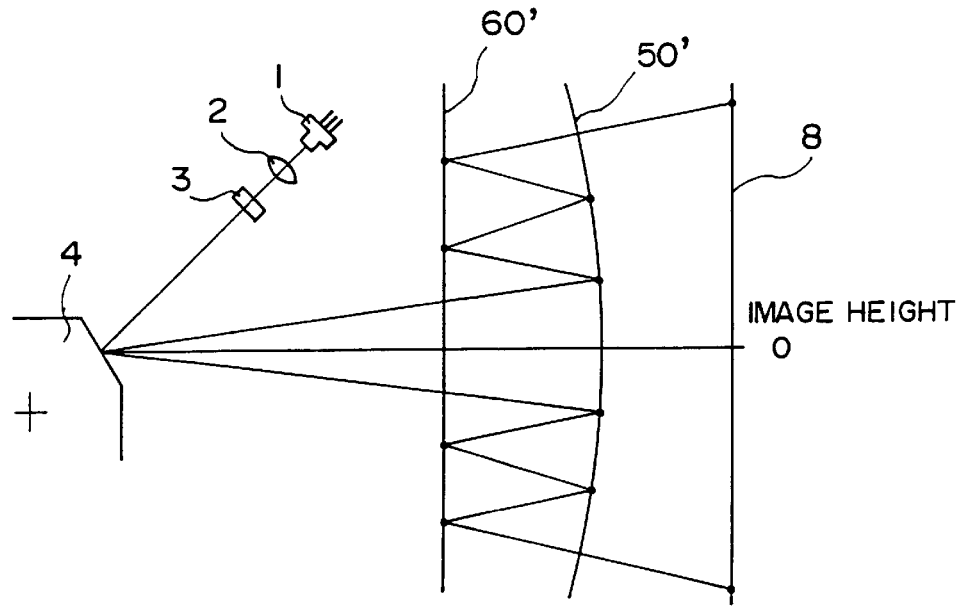
FIG. 19 is a schematic diagram showing a tenth arrangement of the optical scanning apparatus according to the present invention on a main-scanning plane.
Figure 20:
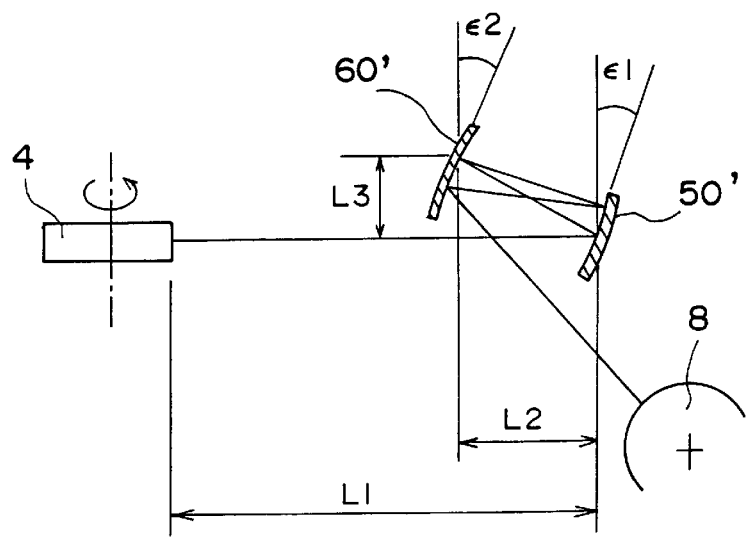
FIG. 20 is a schematic diagram showing a layout of optical elements in the tenth arrangement on a sub-scanning plane.

Referring to FIGS. 19 and 20, the light beam exiting the light source 1 and passing through the coupling lens 2 passes through a cylindrical lens 3 so as to be converged only in the sub-scanning direction, resulting in a line image elongated in a main-scanning direction and formed in the neighborhood of the deflecting and reflecting facet of the deflector 4. The deflector 4 deflects the light beam incident thereon at a constant angular velocity. The light beam reflected by the deflecting and reflecting facet of the deflector 4 is reflected and converged by an image-forming mirror 50' to a cylindrical mirror 60' having a curvature in the sub-scanning direction, in accordance with a tilt ε1 described later. The cylindrical mirror 60' reflects the incident light beam to the image-forming mirror 50' again. The light beam directed to the image-forming mirror 50' is reflected again by the image-forming mirror 50' to the cylindrical mirror 60' again. The light beam then reflected by the cylindrical mirror 60' reaches the scanned surface of the photosensitive drum 8 so as to form a beam spot for scanning the scanned surface of the photosensitive drum 8 at a constant velocity in response to the constant-angular-velocity deflection by the deflector 4. The arrangement shown in FIGS. 19 and 20 differs from the foregoing embodiments in that the cylindrical mirror 60' having a curvature in the sub-scanning direction is used.

Like the arrangement described with reference to FIGS. 1 and 13, the arrangement of FIGS. 19 and 20 uses only one image-forming mirror 50'. However, since the light beam is reflected by the image-forming mirror 50' twice, the arrangement of FIGS. 19 and 20 provides the same capability to correct aberrations as an arrangement where two image-forming mirrors are used. In the arrangement of FIGS. 19 and 20, the deflecting and reflecting surface of the deflector and the scanned surface are in a conjugated arrangement in the sub-scanning direction. Thus, an optical system capable of correcting the facet inclination is provided. More specifically, a variation in scanning pitches due to the facet inclination of the deflector 4 such as a polygon mirror can be corrected properly.

A description will now be given of the configuration of the reflecting surface of the image-forming mirror 50'. The configuration of the reflecting surface of the image-forming mirror 50' is the same as that of the reflecting surface of the image-forming mirror 70. More specifically, as shown in FIG. 12, the reflecting surface of the image-forming mirror 50' has an anamorphic configuration obtained by rotating a curve X(H) drawn with a radius of Rm around a point O on a main-scanning plane, around an axis α residing on the main-scanning plane and parallel with the main-scanning direction, maintaining a radius Rs between the curve X(H) and a point O' where the axis α crosses the radius Rm. Known optical systems including an anamorphic image-forming mirror have a disadvantage in that separation of optical paths is difficult and a scan line bow is relatively large. According to the construction as shown in FIGS. 12, 19 and 20, however, it is possible to separate optical paths without using a half mirror and obtain an optical system characterized by a relatively small scan line bow.

The cylindrical mirror 60' is a reflecting mirror having a radius of curvature Rcy in the sub-scanning direction. Since the cylindrical mirror 60' is used, the optical scanning apparatus as shown in FIGS. 19 and 20 can be flexibly designed to correct the curvature of field in the sub-scanning direction.

Like the image-forming mirror 7, the reflecting surface of the image-forming mirror 50' may have an aspherical configuration obtained by rotating, on a main-scanning plane, a curve X(H) defined as per the equation $$X(H)=CH^2/[1+\{1-(1+K)\ C^2H^2\}^{1/2}]+Ai\ H^i$$

where K indicates a constant of a cone and Ai indicates an aspherical coefficient, around the axis α residing on a main-scanning plane and parallel with the main-scanning direction, maintaining the radius Rs between the point O' and the curve X(H).

FIG. 20 shows the arrangement of FIG. 19 on the sub-scanning apparatus. Referring to FIG. 20, the image-forming mirror 50' is tilted an angle ε1 and the cylindrical mirror 60' is tilted at an angle ε2. The angles ε1 and ε2 are measured in a clockwise direction from a line perpendicular to a main-scanning plane scanned by a beam from the deflector 4. The deflecting and reflecting surface of the deflector 4 is at a horizontal distance L1 from the reflecting surface of the image-forming mirror 50'. The reflecting surface of the cylindrical mirror 60' is at a horizontal distance L2 from the reflecting surface of the image-forming mirror 50'. The reflecting surface of the image-forming mirror 50' reflecting the light beam from the deflector 4 is at a horizontal distance L3 from the reflecting surface of the cylindrical mirror 60' reflecting the light beam from the reflecting surface of the image-forming mirror 50'. To facilitate the understanding, FIG. 20 shows only a light beam having an image height of 0.

A description will now be given of a sixth embodiment of the present invention. The optical scanning apparatus according to the sixth embodiment has the following dimensions.

| | | |
|---|---|---|
| Rm = 380 [mm] | Rs = 147.7 [mm] | K = −4.4 |
| L1 = 50 [mm] | L2 = 19.45 [mm] | L3 = 11.65 [mm] |
| ε1 = 15.46° | ε2 = 25.1° | Rcy = 1000 [mm] |

Figure 21A:
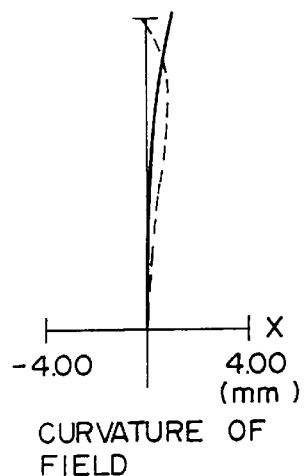
FIG. 21A shows a curvature of field of the optical scanning apparatus according to a sixth embodiment of the present invention.
Figure 21B:
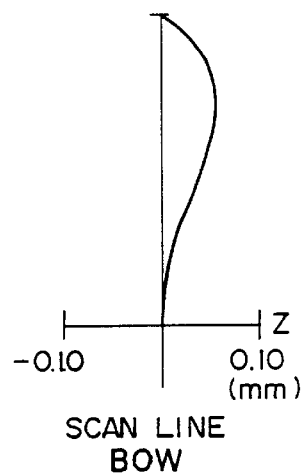
FIG. 21B shows a scan line bow of the optical scanning apparatus according to the sixth embodiment.
Figure 21C:
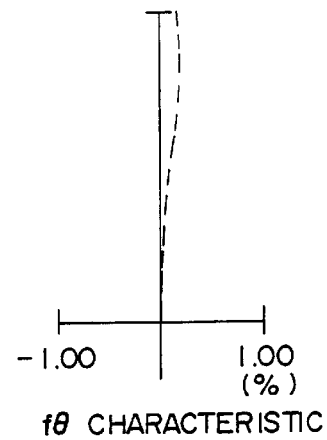
FIG. 21C shows an fΘ characteristic of the optical scanning apparatus according to the sixth embodiment.

FIGS. 21A, 21B and 21C are graphs showing aberrations that occur in an optical scanning apparatus according to the sixth embodiment. FIG. 21A shows a curvature of field occurring when the deflector 4 is rotated, the solid line indicating the curvature of field in the sub-scanning direction and the broken line indicating the curvature of field in the main-scanning direction. The solid line in FIG. 21B indicates the scan line bow. The broken line in FIG. 21C indicates the fΘ characteristic.

While only the constant of a cone K is employed in the sixth embodiment, aberrations are more properly corrected if the aspherical coefficient Ai is also used. The optical scanning apparatus according to the sixth embodiment can be flexibly designed by changing the tilting angles of the cylindrical mirror 60' and the image-forming mirror 50'.

A description will now be given of an alternative configuration of the reflecting surface of the image-forming mirror 50'. As shown in FIG. 18, the image-forming mirror 50' may have a normal toroidal configuration obtained by rotating a curve C drawn with a radius of Rs in the sub-scanning direction, around an X axis residing on the sub-scanning plane and parallel with the sub-scanning direction, maintaining a radius Rm between the curve C and a point O where the axis X crosses the radius Rm. Known optical systems including an anamorphic image-forming mirror have a disadvantage in that separation of optical paths is difficult and a scan line bow is relatively large. According to the construction as shown in FIGS. 18, 19 and 20, it is possible to separate optical paths without using a half mirror and obtain an optical system characterized by a relatively small scan line bow.

A description will now be given of a seventh embodiment of the present invention. The optical scanning apparatus according to the seventh embodiment has the following dimensions.

| | | |
|---|---|---|
| Rm = 420 [mm] | Rs = 161 [mm] | |
| L1 = 65 [mm] | L2 = 27.6 [mm] | L3 = 16.27 [mm] |
| ε1 = 15.24° | ε2 = 23.85° | Rcy = 1000 [mm] |

Figure 22A:
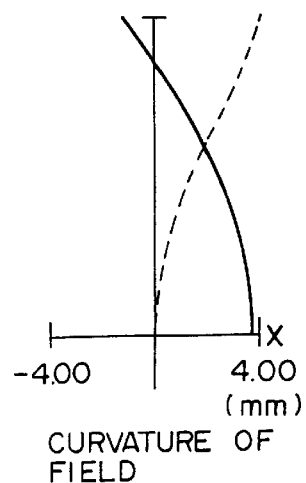
FIG. 22A shows a curvature of field of the optical scanning apparatus according to a seventh embodiment of the present invention.
Figure 22B:
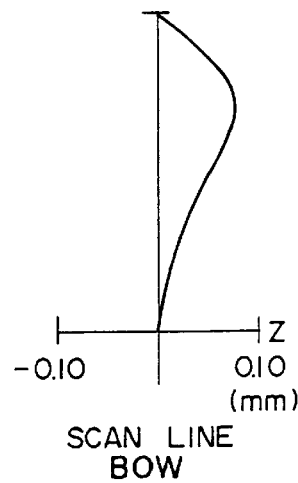
FIG. 22B shows a scan line bow of the optical scanning apparatus according to the seventh embodiment.
Figure 22C:
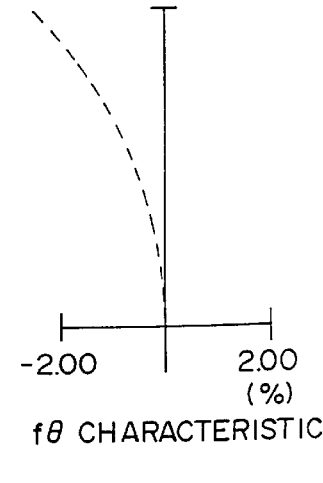
FIG. 22C shows an fΘ characteristic of the optical scanning apparatus according to the seventh embodiment.

FIGS. 22A, 22B and 22C are graphs showing aberrations that occur in an optical scanning apparatus according to the seventh embodiment. FIG. 22A shows a curvature of field occurring when the deflector 4 is rotated, the solid line indicating the curvature of field in the sub-scanning direction and the broken line indicating the curvature of field in the main-scanning direction. The solid line in FIG. 22B indicates the scan line bow. The broken line in FIG. 22C indicates the fΘ characteristic.

The optical scanning apparatus as shown in FIGS. 19 and 20 can be flexibly designed by changing the tilting angles of the cylindrical mirror 60' and the image-forming mirror 50'. The cylindrical mirror 60' is a reflecting mirror having a radius of curvature Rcy in the sub-scanning direction. Since the cylindrical mirror 60' is used, the optical scanning apparatus as shown in FIGS. 19 and 20 can be flexibly designed to correct the curvature of field in the sub-scanning direction.

Figure 23:
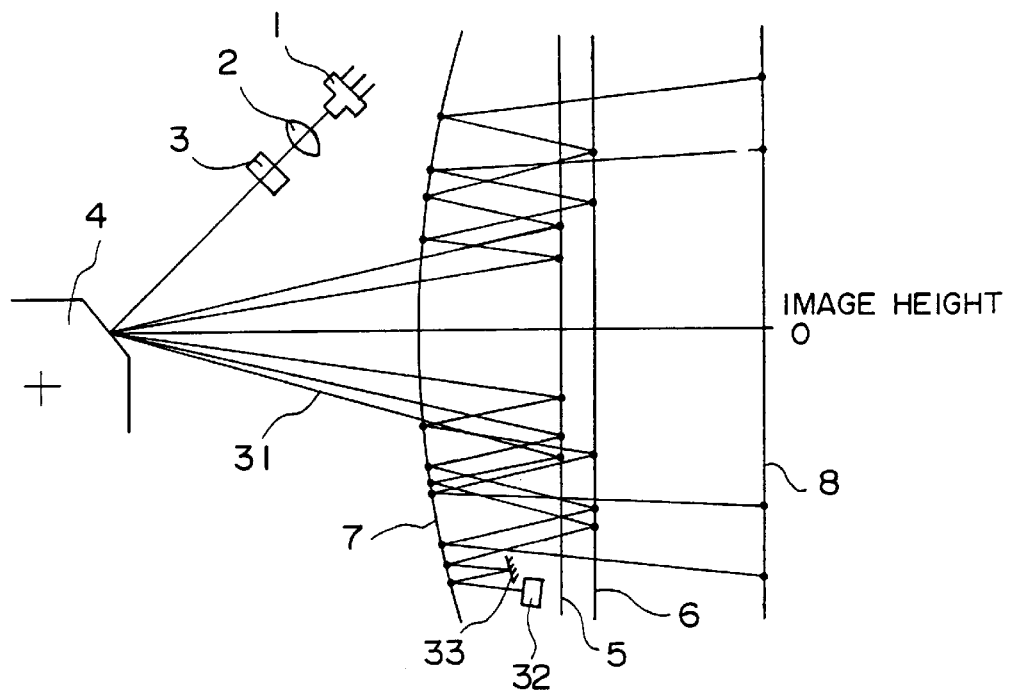
FIG. 23 is a schematic diagram of an eleventh arrangement of the optical scanning apparatus according to the present invention on a main-scanning plane.

A description will now be given, with reference to FIG. 23, of another arrangement of the optical scanning apparatus according to the present invention. Referring to FIG. 23, the light beam reflected by the deflecting and reflecting surface of the deflector 4 is reflected successively by the first return mirror 5, the image-forming mirror 7, the second return mirror 6, the image-forming mirror 7 before reaching the photosensitive drum 8. A synchronization beam 31 provided outside the scanning light beam for ensuring that the beam registration on the scanned surface starts at a predetermined position is reflected by the first return mirror 5 to the image-forming mirror 7. The synchronization beam 31 is then reflected by the image-forming mirror 7 to the second return mirror 6. The synchronization beam 31 is then reflected again by the second return mirror 6 to the image-forming mirror 7. The image-forming mirror 7 then reflects the synchronization beam 31 to a third return mirror 33 provided between the image-forming mirror 7 and the first return mirror 5. The third return mirror 33 reflects the synchronization beam 31 to the image-forming mirror 7. The synchronization beam 31 is then directed by the image-forming mirror 7 to a synchronization detection unit 32. As described above, the synchronization beam 31 is reflected by the image-forming mirror 7 three times while the scanning light beam is reflected by the image-forming mirror 7 twice. Accordingly, it is possible to properly separate the synchronization beam 31 from the scanning light beam even if the optical path of the synchronization beam 31 is short. Therefore, the size of the optical scanning apparatus is reduced. The light beams may be reflected by the image-forming mirror 7 an arbitrary number of times. However, the arrangement as shown in FIG. 23 ensures that the synchronization beam 31 is reflected a total of n+1 or more times assuming that the scanning light beam is reflected a total of n times.

Figure 24:
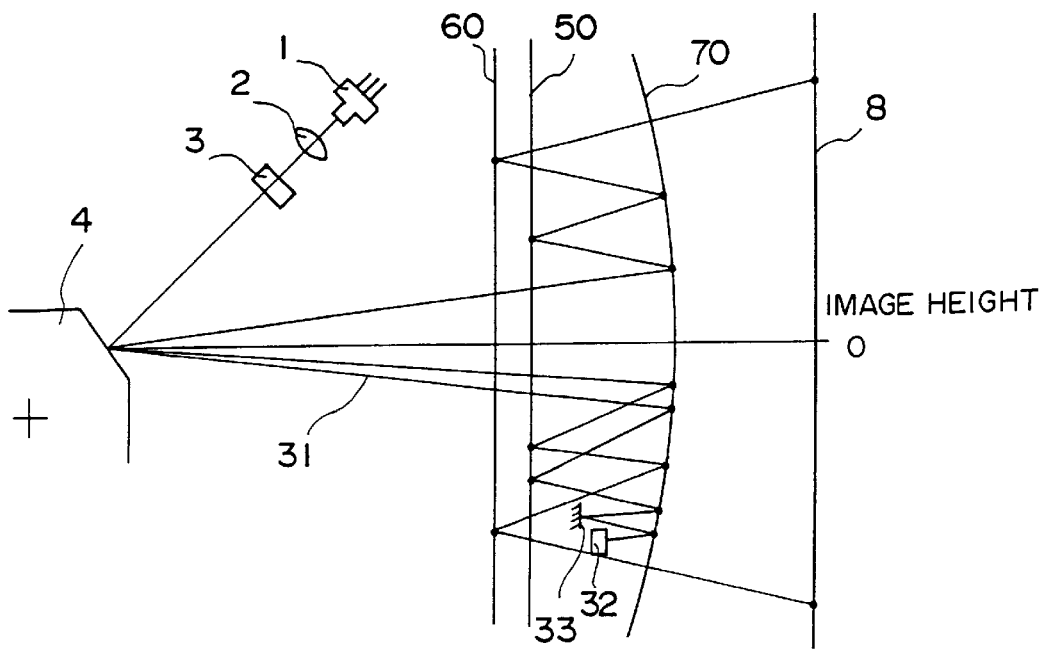
FIG. 24 is a schematic diagram of a twelfth arrangement of the optical scanning apparatus according to the present invention on a main-scanning plane.

While the arrangement of FIG. 23 is a variation of the arrangement of FIG. 1 in that the feature of multiple reflections of the synchronization beam 31 is added, the arrangement shown in FIG. 24 is a variation of the arrangement of FIG. 13 in that the feature of multiple reflections of the synchronization beam 31 is added. Referring to the FIG. 24, the synchronization beam 31 reflected by the deflecting and reflecting surface of the deflector 4 is reflected by the image-forming mirror 70 to the first return mirror 50 which then reflects the synchronization beam 31 to the image-forming mirror 70 again. The image-forming mirror 70 then reflects the synchronization beam 31 to the third return mirror 33. The third return mirror 33 reflects the synchronization beam incident thereon to the image-forming mirror 70 again. The image-forming mirror 70 then reflects the synchronization beam 31 to the synchronization detection unit 32. The third return mirror 33 is a mirror which reflects only the synchronization beam 31 to the image-forming mirror 70. Thus, the arrangement of FIG. 24 ensures that the scanning light beam is reflected by the image-forming mirror 70 a predetermined number of times and the synchronization beam undergoes one additional reflection by the image-forming mirror 70. Accordingly, the synchronization beam 31 can be properly separated from the scanning light beam even if the optical path of the synchronization beam 31 is short. Therefore, the size of the optical scanning apparatus is reduced. The arrangement as shown in FIG. 24 ensures that the synchronization beam 31 is reflected a total of n+1 or more times assuming that the scanning light beam is reflected a total of n times.

While the invention has been described with reference to specific embodiments, the description of the specific embodiments is illustrative only and is not to be construed as limiting the scope of the invention. Various other modifications and changes may occur to those skilled in the art without departing from the spirit and scope of the present invention.

What is claimed is:

1. An optical scanning apparatus comprising:

a light source unit for emitting a light beam for optical scanning;

an image-forming lens for producing a line image, elongated in a main-scanning direction, of the light beam from said light source unit;

a beam deflector for causing the line image to be reflected by its deflecting and reflecting surface so as to produce a deflected light beam deflected at a constant angular velocity;

a reflective optical system including a plurality of reflecting mirrors for reflecting the deflected light beam incident on said reflective optical system a plurality of times; wherein reflecting surfaces of the plurality of reflecting mirrors are tilted with respect to a system axis of said optical scanning apparatus;

said reflective optical system includes an image-forming mirror for converging the deflected light beam to form a beam spot for scanning a scanned surface at a constant velocity wherein the number of reflections of the deflected light beam performed by said image-forming mirror is more than one; and said image-forming mirror has an anamorphic configuration obtained by rotating a curve drawn with a first radius on a main-scanning plane, around an axis residing on the main-scanning plane and parallel with the main-scanning direction, maintaining a second radius.

2. The optical scanning apparatus as claimed in claim 1, wherein said image-forming mirror has an aspherical configuration obtained by rotating an aspherical curve drawn on the main-scanning plane, around an axis residing on the main-scanning plane and parallel with the main-scanning direction, maintaining the second radius.

3. The optical scanning apparatus as claimed in claim 1, wherein said reflective optical system is constructed such that a plurality of reflecting mirrors are formed to be integral with each other and a transparent window for causing an exit ray to pass through is provided as part of the reflective optical system.

4. The optical scanning apparatus as claimed in claim 3, wherein the plurality of reflecting mirrors formed to be integral with each other are provided on a transparent window by vapor deposition.

5. The optical scanning apparatus as claimed in claim 1, wherein the deflected light beam entering said reflective optical system is first incident on the image-forming mirror.

6. The optical scanning apparatus as claimed in claim 5, wherein said reflecting mirrors in said reflective optical system are provided on a transparent window of the optical scanning apparatus by vapor deposition.

7. The optical scanning apparatus as claimed in claim 1, wherein the reflecting mirrors in said reflective optical system are cylindrical mirrors having a curvature in a sub-scanning direction.

8. The optical scanning apparatus as claimed in claim 1, wherein the deflected light beam is reflected by the image-forming mirror and a synchronizing beam is reflected by the image-forming mirror at least once more than the deflected light beam.

9. The optical scanning apparatus as claimed in claim 1, wherein said plurality of reflecting mirrors are arranged such that the deflected light beam reflects against said image forming mirror more than once.

10. An optical scanning apparatus comprising:

light source means for emitting a light beam for optical scanning;

image-forming lens means for producing a line image, elongated in a main-scanning direction, of the light beam from said light source means;

beam deflector means for causing the line image to be reflected by its deflecting and reflecting surface so as to produce a deflected light beam deflected at a constant angular velocity;

reflecting optical means including a plurality of reflecting mirrors for reflecting the deflected light beam incident on said reflecting optical means a plurality of times; wherein reflecting surfaces of the plurality of reflecting mirrors are tilted with respect to a system axis of said optical scanning apparatus;

said reflecting optical means includes an image-forming mirror for converging the deflected light beam to form a beam spot for scanning a scanned surface at a constant velocity wherein the number of reflections of the deflected light beam performed by said image-forming mirror is more than one; and said image-forming mirror has an anamorphic configuration obtained by rotating a curve drawn with a first radius on a main-scanning plane, around an axis residing on the main-scanning plane and parallel with the main-scanning direction, maintaining a second radius.

11. The optical scanning apparatus as claimed in claim 10, wherein said image-forming mirror has an aspherical configuration obtained by rotating an aspherical curve drawn on the main-scanning plane, around an axis residing on the main-scanning plane and parallel with the main-scanning direction, maintaining the second radius.

12. The optical scanning apparatus as claimed in claim 10, wherein said reflecting optical means is constructed such that a plurality of reflecting mirrors are formed to be integral with each other and a transparent window for causing an exit ray to pass through is provided as part of the reflecting optical means.

13. The optical scanning apparatus as claimed in claim 12, wherein the plurality of reflecting mirrors formed to be integral with each other are provided on a transparent window by vapor deposition.

14. The optical scanning apparatus as claimed in claim 10, wherein the deflected light beam entering said reflecting optical means is first incident on the image-forming mirror.

15. The optical scanning apparatus as claimed in claim 14, wherein said reflecting mirrors in said reflecting optical means are provided on a transparent window by vapor deposition.

16. The optical scanning apparatus as claimed in claim 10, wherein the reflecting mirrors in said reflecting optical means are cylindrical mirrors having a curvature in a sub-scanning direction.

17. The optical scanning apparatus as claimed in claim 10, wherein the deflected light beam is reflected by the image-forming mirror and a synchronizing beam is reflected by the image-forming mirror at least once more than the deflected light beam.

18. The optical scanning apparatus as claimed in claim 10, wherein said plurality of reflecting mirrors are arranged such that the deflected light beam reflects against said image forming mirror more than once.

19. An image forming apparatus having an optical scanning apparatus, wherein said optical scanning apparatus comprises:

a light source unit for emitting a light beam for optical scanning;

an image-forming lens for producing a line image, elongated in a main-scanning direction, of the light beam from said light source unit;

a beam deflector for causing the line image to be reflected by its deflecting and reflecting surface so as to produce a deflected light beam deflected at a constant angular velocity; and a reflective optical system including a plurality mirrors for reflecting the deflected beam incident on said reflective optical system a plurality of times;

wherein reflecting surfaces of the plurality of reflecting mirrors are titled with respect to a system axis of said optical scanning apparatus;

wherein said reflective optical system includes an image-forming mirror for converging the deflected light beam to form a beam spot for scanning a scanned surface at a constant velocity wherein the number of reflections of the deflected light beam performed by said image-forming mirror is more than one; and wherein said image-forming mirror has anamorphic configuration obtained by rotating a curve drawn with a first radius on a main-scanning plane, around an axis residing on the main-scanning plane and parallel with the main-scanning direction, maintaining a second radius.

20. An image forming apparatus having an optical scanning apparatus, wherein said optical scanning apparatus comprises:

light source means for emitting a light beam for optical scanning;

image-forming lens means for producting a line image, elongated in a main-scanning direction, of the light beam from said light source means;

beam deflector means for causing the line image to be reflected by its deflecting and reflecting surface so as to produce a deflected light beam deflected at a constant angular velocity; and reflecting optical means including a plurality of reflecting mirrors for reflecting the deflected light beam incident on said reflecting optical means a plurality of times;

wherein reflecting surfaces of the plurality of reflecting mirrors are titled with respect to a system axis of said optical scanning apparatus;

wherein said reflecting optical means includes an image-forming mirror for converging the deflected light beam to form a beam spot for scanning a scanned surface at a constant velocity wherein the number of reflections of the deflected light beam performed by said image-forming mirror is more than one; and wherein said image-forming mirror has anamorphic configuration obtained by rotating a curve drawn with a first radius on a main-scanning plane, around an axis residing one the main-scanning plane and parallel with the main-scanning direction, maintaining a second radius.

* * * * *